Figure 2:
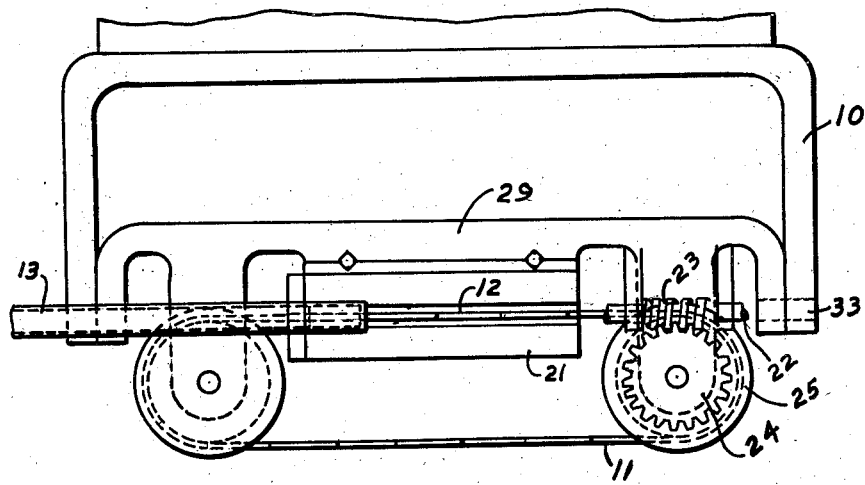

Sept. 2, 1947. K. W. ROCKSTROH 2,426,751
DEVICE FOR ROTATING ROUNDED OBJECTS
Filed June 4, 1945 3 Sheets-Sheet 1

INVENTOR.
KENNETH W. ROCKSTROH
BY
Benedict & Swartwood

Sept. 2, 1947.　　　　K. W. ROCKSTROH　　　　2,426,751
DEVICE FOR ROTATING ROUNDED OBJECTS
Filed June 4, 1945　　　　3 Sheets-Sheet 2

INVENTOR.
KENNETH W. ROCKSTROH
BY
Benedict & Swartwood

Sept. 2, 1947.  K. W. ROCKSTROH  2,426,751
DEVICE FOR ROTATING ROUNDED OBJECTS
Filed June 4, 1945  3 Sheets-Sheet 3

INVENTOR.
KENNETH W. ROCKSTROH
BY
Benedict & Swartwood

Patented Sept. 2, 1947

2,426,751

UNITED STATES PATENT OFFICE 2,426,751

DEVICE FOR ROTATING ROUNDED OBJECTS

Kenneth W. Rockstroh, Danville, Ill., assignor to Samuel C. Hurley, Jr., Danville, Ill.

Application June 4, 1945, Serial No. 597,567

3 Claims. (Cl. 214—1)

This invention relates to a device for feeding and monitoring unit articles and is particularly useful for the scanning of rounded articles by rotating them in a photoelectric inspection zone.

One of the objects of the invention is to provide an improved method for feeding articles to a unit operation and an improved means for monitoring said articles and particularly an improved apparatus for maintaining only one rounded article at a time in an operational zone.

A further object of the invention is to provide an improved positioning means for rotating a rounded article in a photoelectric inspection zone so that there is a direct ratio between the diameter of the round and the distance between the top of the round and the support.

Other objects of the invention are to provide a novel apparatus for spinning rounded articles in a photoelectric inspection zone, for maintaining only one article at a time in the inspection zone and for removing the article so inspected and placing the next article in the inspection zone.

Still another object of the invention is to provide a continuous belt or conveyor having spaced openings or slots therein for receiving the articles to be introduced to the inspection zone thereby eliminating most of the moving parts which are ordinarily required in present monitoring devices.

Still another object of the invention is to provide an apparatus for scanning the entire circumference of a rounded article and by use of a suitable arrangement of a light beam and a light sensitive device the circumference of the rounded article may be scanned.

Although the invention is not limited to photoelectric inspection operations since the invention could be used for polishing, machining and other operations on an article, it is particularly useful in connection with making photoelectric inspections for determining the following dimensional characteristics of a rounded article: (1) diameter (2) length (3) bevel (4) curvature (5) alignment (6) parallelism (7) internal rounded surfaces for eccentricity and concentricity (8) external rounded surfaces for eccentricity and concentricity (9) irregularities in surfaces such as flat spots, depressions, ridges and so forth (10) to determine the location, shape and size of different parts of segments such as slots, grooves, scratches, threads and the like (11) to determine whether a piece is true, for example: whether the end of a cylinder is at the right angles with its longitudinal dimension (12) major diameter, pitch diameter, angle, lead and so forth of threads.

By a rounded object as used herein is meant any bearing surface which is rounded and by way of example the following are given to indicate the various kinds of rounded articles that may be processed or inspected by this invention: pins, tubes, rivets, tops, bullet shapes, spools, hour glass shapes, cones, ellipsoids, truncated cylinders and cones, barrel shapes, paraboloids, cylinders, spheres, screws, threads and bolts.

Previous photoelectric inspection methods for determining shapes and dimensions of a rounded article did not involve scanning the rounded article by rotating it in an inspection zone and therefore inaccuracies in inspection were unavoidable. By my method and apparatus the circumference of a rounded article may be inspected and I therefore provide an improved, accurate and speedy method for inspection of rounded articles.

A further object of my invention therefore is to provide an improved monitoring means and means for rotating a rounded article in a photoelectric inspection zone particularly for inspection of small rounded objects of less than ¼" in diameter. While it is comparatively easy to inspect large objects it has been found difficult to find a suitable apparatus for monitoring and feeding small objects to an inspection zone and in maintaining them in the inspection zone while being rotated particularly in the case of small objects having flanges, bevels and the like. By my method and device these obstacles have been overcome.

Broadly my invention comprises means for continuously feeding a rounded object to an operational zone and means for rotating the rounded object while it passes through the operational zone.

More particularly the invention comprises the combination of an improved feeding and monitoring device comprising a chain, belt or conveyor having spaced slots therein and having a feedway associated therewith for feeding unit articles into the slots whereby they are conveyed to the operational zone and from which they may be subsequently removed.

Still more specifically the invention comprises in combination an assembly comprising a rotation means including a rotatable shaft having a roller attached thereto, a feedway associated therewith, a continuous conveyor having spaced slots for receiving unit articles from the feedway, means for rotating the rounded article by the rotation means as it is passed through the inspection zone by the continuous conveyor and means for ejecting the article from the conveyor after it leaves the operational or inspection zone.

Figure 1:
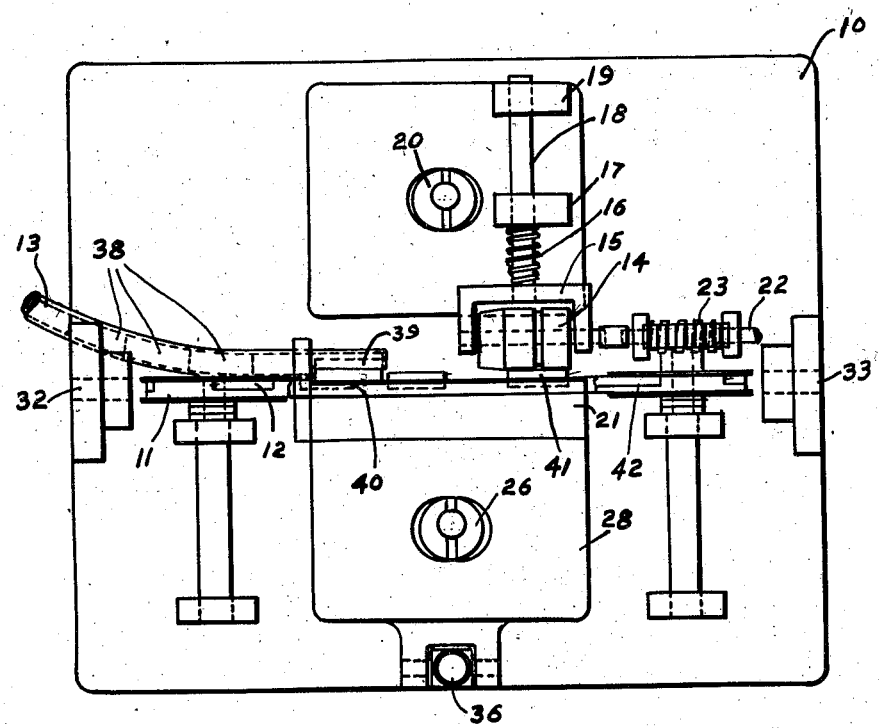
Figure 3:
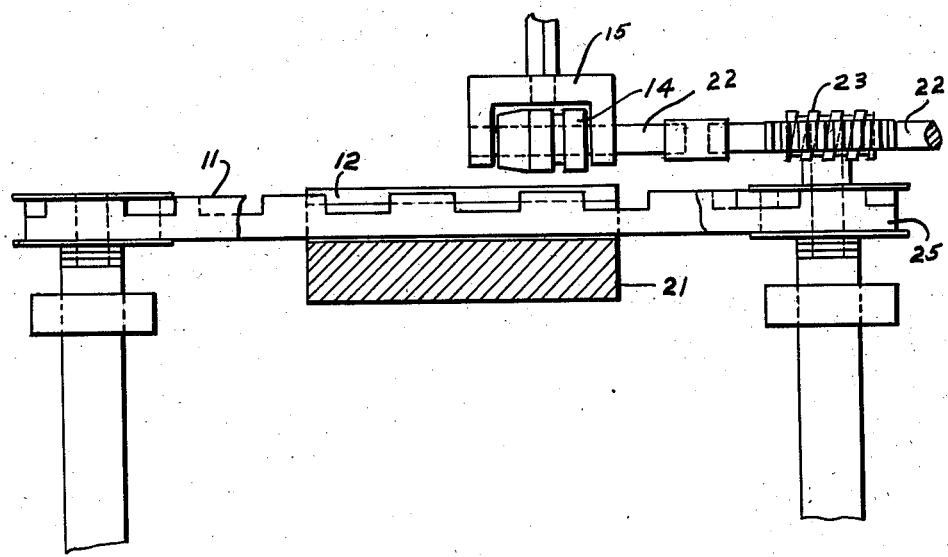
Figure 4:
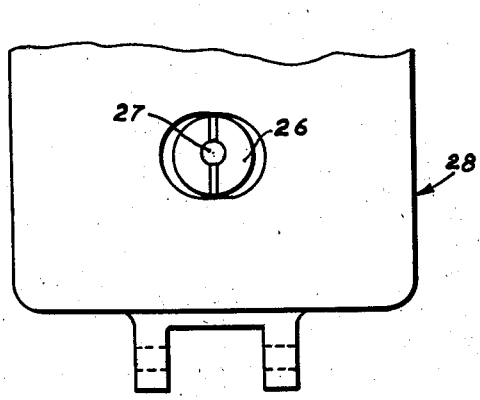
Figure 5:
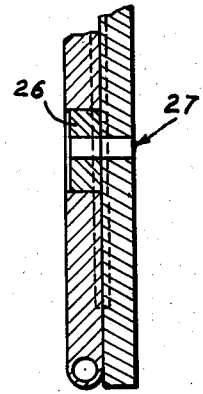
Figure 6:
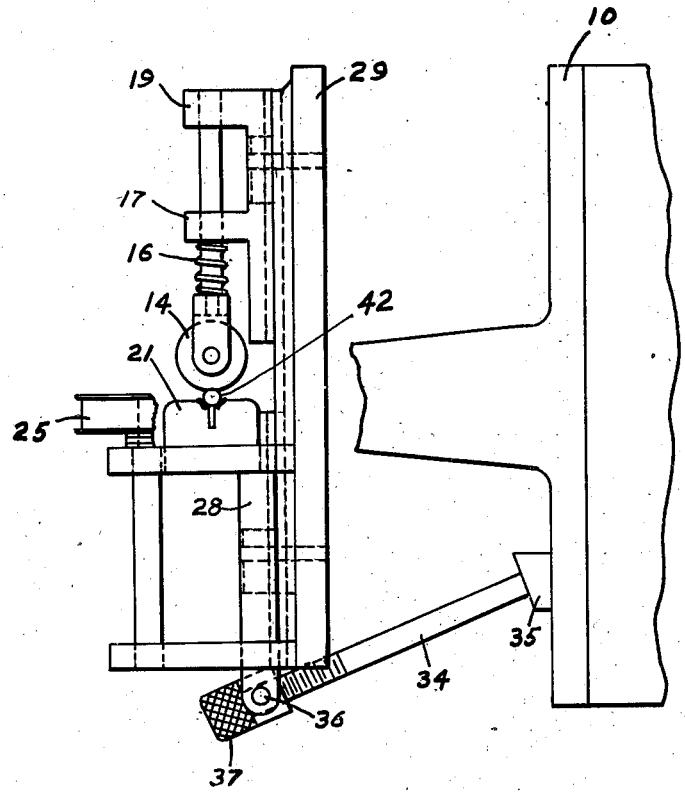
Figure 9:
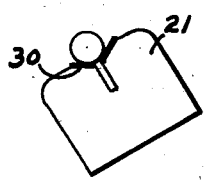
Figure 7:
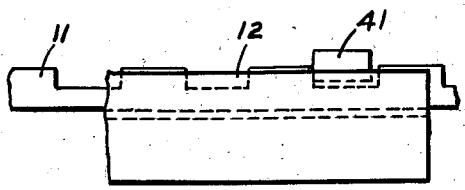
Figure 8:
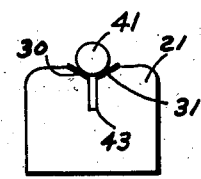

Other advantages, objects, uses and applications of my invention will become readily apparent by referring to the drawings in which Figure 1 is a front elevation view of the assembly showing the arrangement of the rotation means, the feed tube and the continuous conveyor; Figure 2 is a plan view corresponding to Figure 1; Figure 3 is an enlarged view of Figure 1 showing primarily the means for rotating the rounded article in the inspection zone and the continuous conveyor belt for feeding the articles thereto; Figures 4 and 5 illustrate the manner of adjusting the distance between the rotation means and the support to accommodate different sized rounded articles; Figure 6 is a side elevation corresponding to Figure 1 showing primarily the means for rotating the assembly such that the rounded article during the inspection is diametrically out of round rather than circumferentially out of round; Figures 7 and 8 show more in detail the arrangement of the continuous conveyor and the V-block support when the center line dividing the V is substantially vertical and Figure 9 shows the V-block as it is adjusted by the arrangement in Figure 6 so that one side of the V is substantially horizontal.

Referring to the drawings 10 indicates a frame for supporting the assembly, 11 indicates the continuous conveyor having spaced slots or openings 12 for feeding unit articles to the inspection zone. Although as explained previously this invention includes other uses than photoelectric inspection, the description of the drawings will be given in connection with photoelectric inspection of rounded articles as one example of many uses of the invention.

The feed tube or feedway 13 provides a reservoir for the articles to be fed to the continuous conveyor 11 and is associated with the conveyor 11 in such a manner that only one rounded article can leave the feed tube to enter the continuous conveyor. This will be more fully described later. A roller 14 journaled in the U-shaped support 15 is provided for rotating the rounded articles during the inspection operation. The proper tension is maintained on the articles during rotation by means of the spring 16 compressed between the extended boss 17 and the U-shaped member 15. The vertical movement of the rod 18 to which the roller is attached is provided by arranging it in the guide slots 17 and 19. Cam 20 is provided as the adjusting means for changing the tension on the spring 16. The V-block 21 is used for positioning the article and for providing a bearing surface while the article is rotated in the photoelectric inspection zone. A prime mover such as a motor or other means is operatively attached to the shaft 22 which directly turns the roller 14 at a speed of about 400 R. P. M. and also turns the worm 23 which meshes with the worm gear 24 thereby turning the pulley 25 which is the means for continuously moving the conveyor 11.

Referring particularly to Figures 1, 4 and 5 the arrangement and means of operation of the cam 26 is shown. The cam comprises a round which has a shaft 27 off center. By rotating the round 26 on this shaft it raises and lowers plate 28 to which the V-block is attached. The cam 20 previously discussed also operates and functions in the same manner for adjusting the tension on spring 16.

Referring to Figures 6 and 9 means are shown for rotating the assembly 29 to provide for the inspection of the round while the V of the V-block has one side substantially horizontal. In making critical and highly precise measurement of rounded articles of the order of several hundred thousandths of an inch, it is preferable to have the rounded article supported by the V-block as shown on Figure 9 rather than supporting the rounded article in the V-block 21 as is shown in Figure 8. The reason why the position of the V-block as shown in Figure 9 is preferable, is that for each increment in the change in the diameter of the round, a corresponding increase in the distance between the top of the round and the point of support of the bottom of the round in the V-block occurs and this increases the sensitivity in photoelectric inspections. Whereas in the Figure 8 if the two sides of the V-block 30 and 31 are at an angle of 120° for each increment of increase of diameter the increase in the distance from the top of the round to the support in the V-block is about ⅓ of that shown in Figure 9. Furthermore if the V-block has the sides 30 and 31 at a 120° angle as shown in Figure 8, the assembly 29 must be rotated 30° to obtain the position of the V-block as shown in Figure 9. To accomplish that the assembly 29 is rotated in the following manner. The assembly 29 is pivotedly attached to the U-frame 10 at points 32 and 33. These points are shown clearly in Figure 1 but are not shown in Figure 6 since it would complicate the drawing. Shaft 34 is attached at point 35 to the U-frame 10 and is attached by threads to the assembly 29 at point 36. Adjusting nut or handle 37 is provided so that by turning the nut in a clock-wise manner the assembly 29 can be caused to pivot about points 22 and 23 to change the position of the V-block from Figure 8 to Figure 9 which is highly desirable when measuring articles within a very close tolerance range.

A brief description of the manner of operation of my device illustrative of the invention is as follows: Assuming it is desired to check a pin or round for diameter, a supply of the pins 38 are introduced into the feedway or feed tube 13. Referring to Figure 1 a pin 39 is shown abutting up against the end of the feedway 13 which prevents that pin from entering the slot 40 until the slot 40 comes into the proper position. As shown in Figure 1 the pin 39 is just ready to drop into the slot 40. Pin 41 has previously been dropped into a slot and is shown in testing position directly under the roller so that the pin is rotated thereby during the photoelectric inspection operation.

The particular means of selecting the article according to the photoelectric inspection is not shown since that does not form any part of my invention. In general it is accepted or rejected as follows: referring to Figure 6 a light beam is passed through the photoelectric inspection zone which is the zone occupied by pin 41 and by the use of proper projecting and condensing lenses an image or shadow of the pin may be caused to fall upon one or more light sensitive devices. The proper positioning of the light sensitive devices and their proper arrangement in the electronic circuit provide a means for measuring or indicating the diameter of the rounded object of pin 41. It should be noted that the pin 41 is passed through the photoelectric inspection zone by means of the continuous conveyor belt 11 and while it passes therethrough it is rotated by the roller 14. Thus a means is provided for scanning the entire circumference of the rounded article as it passes through the inspection zone.

After the rounded article passes through the inspection zone, it may be ejected from the apparatus in any suitable manner such as by an air blast or by proper arrangement in Figure 1. When the slotted opening 12 in the conveyor belt reaches the point 42, the rounded article would no longer be supported on either side and it would drop out of the slot. Other arrangement can be provided for accepting or rejecting the rounded article according to the results of the photoelectric inspection operation.

It is preferable not to have the rounded article or pin 41 supported or bearing on the conveyor belt while it is passing through the inspection zone, because any wear on the bearing surface or the slots in the conveyor belt would cause inaccuracies in the photoelectric inspection. Referring to Figures 7 and 8 is shown a means for supporting the rounded article 41 on the sides 30 and 31 of the V-block. Sides 30 and 31 are usually constructed of materials resistant to erosion and wear and furthermore it is only necessary to check the wear on the V-block which is relatively simple when compared to the wear on each individual slot on the conveyor belt. The conveyor belt 11 therefore passes through the slot 43 in the V-block 21 and while it moves the pin 41 along the V-block and the supports 30 and 31 actually support the pin 41 while it passes along the V-block is illustrated in Figure 7. In other words the V-block is the entire support for the pin 41 as it is rotated through the inspection zone.

The above description and illustration and drawings are not intended to limit my invention which is only limited by the following claims.

I claim as my invention:

1. An apparatus for rotating rounded articles in a photoelectric inspection zone comprising a frame, a continuous conveyor having recesses therein movably attached to said frame, means for moving the continuous conveyor, a feed-way associated with said conveyor for feeding one rounded article at a time to said recesses, a rotation means journalled in said frame and adapted and arranged to rotate said unit articles as the continuous conveyor moves said articles past and in contact with said rotation means, an article support supported in said frame and spaced from and opposite to said rotation means for supporting the unit article during rotation and said article support serving as the sole support during said rotation of the rounded article while it is moved along said article support by the continuous conveyor.

2. An apparatus for scanning rounded articles during rotation in a photoelectric inspection zone comprising a frame assembly adjustably pivoted on a second frame, a rotation means including a roller journalled in said frame assembly, a V-block spaced from said rotation means to provide the sole support for article rotated by said rotation means, means for adjusting said frame assembly about its pivot so as to rotate the V-block support from a position where the center line of the V is substantially vertical to a position where the one side of the V is substantially horizontal.

3. An apparatus for rotating rounded articles in a photoelectric inspection zone comprising a frame, a continuous conveyor having recesses therein movably attached to said frame, means for moving the continuous conveyor, a feed way associated with said conveyor for feeding one rounded article at a time to said recesses, a rotation means journalled in said frame and adapted and arranged to rotate said unit articles as the continuous conveyor moves said unit articles past and in contact with the rotation means, a V-block serving as a reference point for the photoelectric inspection operation adjustably mounted in said frame and spaced from and opposite to said rotation means, said V-block having means for entirely supporting the rounded article during rotation by the rotation means comprising said block having an opening connected with the open V-portion of the block through which the continuous conveyor passes such that V-block provides the entire bearing surface for the rounded article as the conveyor moves the article along the V-block.

KENNETH W. ROCKSTROH.

REFERENCES CITED

The following references are of record in the file of this patent:

UNITED STATES PATENTS

| Number | Name | Date |
| --- | --- | --- |
| 188,569 | Beers | Mar. 20, 1877 |
| 1,200,836 | Hendrich | Oct. 10, 1910 |
| 1,676,639 | Elliot et al. | July 10, 1928 |
| 2,151,365 | Winkler | Mar. 21, 1939 |
| 2,219,425 | Lott | Oct. 29, 1940 |